United States Patent Office 2,833,781
Patented May 6, 1958

2,833,781

ISOTHIOUREA-ALKYLSULFONATES

Hermann Haas, Dusseldorf-Holthausen, Germany, assignor to Bohme Fettchemie G. m. b. H., Dusseldorf, Germany, a corporation of Germany No Drawing. Application July 13, 1954
Serial No. 443,147

Claims priority, application Germany July 13, 1953

5 Claims. (Cl. 260—309.6)

This invention relates to derivatives of thiourea and more particularly to sulfonic acid derivatives of thiourea and methods of making the same from thiourea and sultones.

I have found that novel and valuable compounds can be produced by subjecting thiourea or an N-substituted derivative of thiourea having at least one hydrogen atom still attached to one or both of the nitrogen atoms to a reaction with a sultone. The reaction product is a derivative of thiourea containing sulfonic acid groups.

The general mechanics of the reaction between thiourea or derivatives of thiourea and sultones can be illustrated by the reaction between thiourea and propane sultone, as follows:

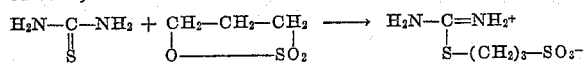

The sulfonic acid thiourea compounds thus obtained have a salt-like hybrid structure which is indicated by their neutral character and their relatively high melting points.

Derivatives of thiourea which may be reacted with sultones to form the sulfonic acid derivatives of thiourea in accordance with my invention have the general structural formula—

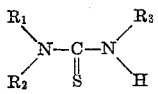

wherein $R_1$, $R_2$ and/or $R_3$ represent a hydrogen atom and hydrocarbon radicals of all types including acyl radicals. The hydrocarbon radicals may contain hetero atoms and hetero atom groups, either as a part of the carbon chain or as substituents or both. $R_1$ and $R_2$ or $R_1$ and $R_3$ may also form a part of a heterocyclic ring system. Finally, $R_1$, $R_2$ and/or $R_3$ may represent amino or imino groups, either substituted or unsubstituted.

Examples of substituted thiourea compounds having the above general structural formula which may be reacted with sultones in accordance with my invention are the following:

N-ethylthiourea
  N-dodecylthiourea
  N-phenylthiourea
  N-p-tolylthiourea
  N-acetylthiourea
  N,N-diethylthiourea
  N,N'-diethylthiourea
  N,N,N'-triethylthiourea
  N,N'-diphenylthiourea
  Ethylenethiourea
  Phenylenethiourea
  Thiosemicarbazide
  4-methylthiosemicarbazide
  2,4-dimethylthiosemicarbazide The above general structural formula also includes those thiourea derivatives which have an acid reaction because of their substituents and which form salts of the thiol class. Such thiourea derivatives are advantageously reacted with a sultone in accordance with my invention in the form of their salts, particularly their alkali metal salts. In the event that such acid-reacting thiourea derivatives are reacted with propane sultone, for example, the reaction product will contain the following characteristic group:

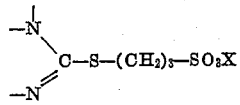

wherein X represents an alkali metal.

Examples of such acid thiourea derivatives are:

Thiobarbituric acid
  2-methylthiouracil
  Dithizone and the like.

Sultones which are suitable for producing the sulfonic acid derivatives of thiourea in accordance with my invention include aliphatic, cycloaliphatic and aromatic sultones, either substituted or unsubstituted.

Examples of sultones which may be reacted with the above thiourea derivatives to yield sulfonic acid thiourea derivatives in accordance with my invention are the following:

1,3-propanesultone
  1,4-butanesultone
  Isopentanesultone
  Tolylsultone
  1,8-naphthalenesultone and the like, as well as mixtures of 1,3- and 1,4-butanesultone.

The reaction in accordance with my invention will take place at room temperature and in many cases is exothermic.

The reactants are advantageously suspended or dissolved in organic solvents or diluents such as, for example, lower molecular alcohols. However, in certain cases where the reactants cannot be advantageously dissolved or suspended in such solvents, they may be first ground in the presence of each other without solvents and then allowed to react at moderately elevated temperatures.

The reaction between the above thiourea derivatives and sultones takes place practically quantitatively, even with the above-identified acid-reacting thiourea derivatives and their alkali metal salts.

The resulting sulfonic acid thiourea compounds possess valuable insecticidal and fungicidal properties, and are also important intermediate products in the manufacture of other fungicides and insecticides as well as of pharmaceutical compounds. Moreover, the compounds produced in accordance with my invention are capable of use as brightening agents in electroplating baths and as inhibitors.

The following examples will aid persons skilled in the art in understanding my invention more thoroughly; however, it is understood that the examples are given only as illustrations and that my invention is not limited to their terms and conditions.

*Example I*

76 gm. thiourea were dissolved in 400 cc. methanol while applying a small amount of heat and the warm solution was mixed with 122 gm. propanesultone. The reaction began to take place soon thereafter, accompanied by vigorous effervescence and boiling. After short time the reaction product precipitated out in its crystalline form. The precipitate was filtered off by suction filtration and the filter cake was washed with methanol. Thereafter the precipitate was recrystallized from hot water. The recrystallized product was found to have the following structural formula:

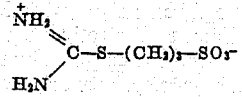

It had a melting point of 251–253° C. The yield was 189 gm.

Example II 76 gm. thiourea were dissolved in 400 cc. methanol while applying a small amount of heat. The warm solution was then mixed with 136 gm. technically pure 1,4-butanesultone. The entire mixture was then refluxed for about 30 minutes and then cooled. A crystalline precipitate was formed which was filtered off, washed with methanol, and recrystallized from hot water. The product was a crystalline substance in the form of long needles. Its structural formula was found to be—

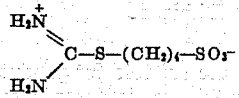

and it had a melting point of 257–258° C. The yield was 172 gm.

Example III 14.2 gm. N-phenylthiourea were dissolved in 200 cc. methanol and 12.2 gm. propanesultone were added to this solution. The mixture was then refluxed for about 30 minutes. A crystalline precipitate was formed shortly thereafter. The crystalline substance was filtered off and recrystallized from hot water. The recrystallized reaction product was found to have the structural formula—

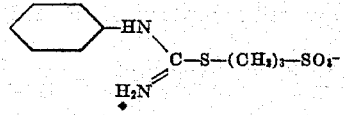

and had a melting point of 251–252° C. The yield was 22–24 gm.

Example IV 16.6 gm. p-tolylthiourea were dissolved in 200 cc. absolute alcohol and then 12.2 gm. propanesultone were added to the solution. This reaction mixture was then refluxed for one-half hour. A crystalline precipitate was formed after a short time. The precipitate was filtered off and recrystallized from water. It was found to have the structural formula—

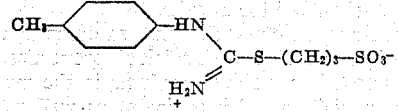

and a melting point of 266° C. The yield was 26.5 gm.

Example V 11 gm. N,N'-diphenylthiourea were dissolved in 200 cc. benzene and then heated for several hours on a water bath with 6 gm. propanesultone. A white precipitate formed. The precipitate was filtered off and washed with benzene and then recrystallized from an aqueous solution of glacial acetic acid. The structural formula of the reaction product was found to be—

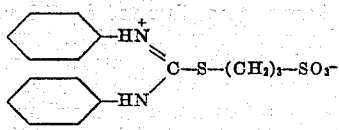

which had a melting point of 241.5° C. The yield was 14.5 gm.

Example VI 16.0 gm. of the sodium salt of 4-methylthiouracil were dissolved in 150 cc. methanol and 12.2 gm. propanesultone were added to this solution. The mixture was heated on a water bath for a few minutes. After a short time the solution turned cloudy and a precipitate was formed. The precipitate was filtered off and its structural formula was found to be—

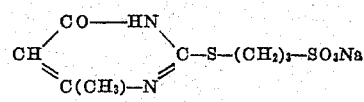

The yield was 26 gm.

Example VII 2.56 gm. dithizone were mixed with an equimolar amount of sodium methylate and the mixture was dissolved in 50 cc. methanol. 1.22 gm. propanesultone were then added to this solution and the whole mixture was heated for 15 minutes on a water bath. After standing for a short time the crystalline reaction product precipitated out. Its structural formula was found to be

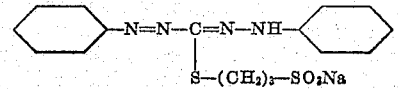

The yield was about 3 gm.

Example VIII 17.9 gm. benzaldehyde-thiosemicarbazone were dissolved in 100 cc. of a 1 N methanolic sodium methylate solution, and then 12.2 gm. molten propanesultone were added while cooling the solution. The temperature of the solution rose to 50° C. despite cooling. After less than one minute the reaction product precipitated out in the form of the sodium salt having the structural formula—

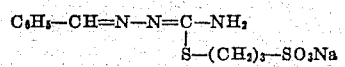

The contents of the reaction vessel changed into a thick paste. After allowing the paste to stand for a few minutes in the heated condition, the mass was cooled and the liquid portion was filtered off by suction. The filter cake weighed 25 gm. By further evaporating the filtrate an additional 6 gm. of the reaction product were recovered. The precipitate recovered by evaporation was recrystallized from a mixture of methanol and isopropanol and appeared in the form of shiny scales which were readily soluble in water. The solution had a weakly alkaline reaction. The precipitated sodium salt was dissolved in water and a stoichiometric amount of dilute hydrochloric acid was added to this solution. The precipitate formed was found to be the free acid of the above sodium salt. It was filtered off and recrystallized from ethyl alcohol. The melting point of the recrystallized product was found to be 230–231° C. The yield was practically quantitative.

Example IX 20.9 gm. p-methoxybenzaldehyde-thiosemicarbazone were reacted with 12.2 gm. propanesultone in the same manner as in Example VIII, yielding 27 gm. of the sodium salt having the structural formula—

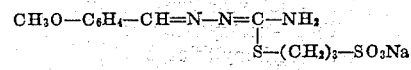

By evaporation the filtrate yielded another 6.5 gm. of the sodium salt.

Example X 150 cc. boiling water were poured over 51 gm. ethylenethiourea and the mixture was thoroughly stirred.

The thiourea compound was only partially dissolved. To this warm saturated solution and undissolved solid, 61 gm. propanesultone were gradually added with constant stirring. After a little more than half of the sultone was added the ethylenethiourea went entirely into solution. After all of the sultone was added and dissolved, the solution was heated over a water bath until a film formed on the surface of the liquid. Three times the volume of this solution of isopropylalcohol was added and the mixture was stirred repeatedly. A crystalline precipitate was formed which was filtered off and washed with alcohol. The structural formula of these crystals was found to be—

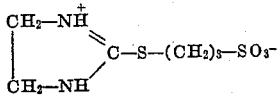

and their melting point was 245° C. The yield was 99 gm.

*Example XI*

15.0 gm. phenylenethiourea (2-mercaptobenzimidazole) were dissolved in 100 cc. of a 1 N methanolic sodium methylate solution. 12.2 gm. propanesultone were added to this solution without heating, and after all the sultone was added the mixture was heated slowly and carefully. Finally, the mixture was refluxed for about 10 minutes. The reaction mixture was then evaporated to 60 cc. and isopropylalcohol was added while the solution was still hot until the cloudiness remained. The solution was cooled and the reaction product precipitated out. The precipitate was filtered off. It was found to have the structural formula—

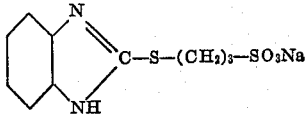

and the yield was 25.5 gm.

*Example XII*

13.2 gm. N,N'-diethylthiourea were dissolved in 25 cc. methanol. To this solution 12.2 gm. propanesultone were added, and the entire mixture was refluxed for about 15 minutes. To this reaction mixture 50 cc. isopropanol were added and the mixture was allowed to cool. A crystalline precipitate was formed which was recrystallized from a mixture of methanol and isopropanol. The crystalline reaction product was found to have the structural formula—

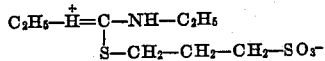

The yield was 23 gm. The melting point of the recrystallized product was found to be 230–231° C.

While I have given certain examples and illustrations of my invention, it is to be understood that the invention is not limited to the examples given and that many variations and changes may be made therein within the spirit of my invention and the scope of the following claims.

I claim:
1. The process of producing a compound having the structural formula

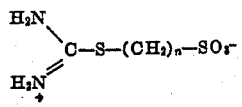

wherein $n$ is an integer from 3 to 4, inclusive, which comprises reacting thiourea with an alkyl sultone selected from the group consisting of propane sultone and butane sultone at substantially room temperature, and separating the reaction product from the reaction mass.

2. The process of claim 1, which comprises in addition recrystallizing the reaction product from hot water.

3. The process of producing a compound having the structural formula

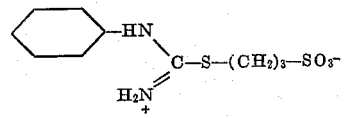

which comprises reacting N-phenyl-thiourea with propane sultone at substantially room temperature, and separating the reaction product from the reaction mass.

4. The process of producing a compound having the structural formula

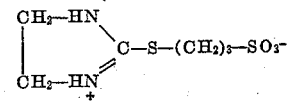

which comprises reacting ethylene thiourea with propane sultone at substantially room temperature, and separating the reaction product from the reaction mass.

5. The process of producing compounds selected from the group of compounds having the structural formulas

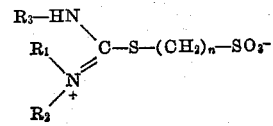

and

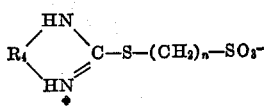

wherein $R_1$ is selected from the group consisting of hydrogen, phenyl and ethyl, $R_2$ is hydrogen, $R_3$ is selected from the group consisting of hydrogen, phenyl, p-tolyl and ethyl, $R_4$ is an ethylene radical and $n$ is an integer from 3 to 4, inclusive, which comprises reacting a compound selected from the group consisting of compounds having the structural formulas

and

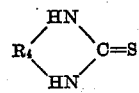

wherein $R_1$, $R_2$, $R_3$ and $R_4$ have the meaning above indicated, with an alkyl sultone having an alkyl chain of from 3 to 4 carbon atoms, inclusive, at substantially room temperature, and separating the reaction products from the reaction mass.

References Cited in the file of this patent
UNITED STATES PATENTS 2,672,463    Huebner              Mar. 16, 1954
2,695,310    Schramm et al.       Nov. 23, 1954

UNITED STATES PATENT OFFICE
Certificate of Correction

Patent No. 2,833,781          May 6, 1958

Hermann Haas

It is hereby certified that error appears in the printed specification of the above numbered patent requiring correction and that the said Letters Patent should read as corrected below.

Column 5, lines 53 to 54, the formula should appear as shown below instead of as in the patent—

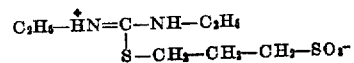

Signed and sealed this 8th day of July 1958.

[SEAL]

Attest:
KARL H. AXLINE,
*Attesting Officer.*

ROBERT C. WATSON,
*Commissioner of Patents.*